United States Patent [19]
Hansen

[11] Patent Number: 5,504,630
[45] Date of Patent: Apr. 2, 1996

[54] BEAM STEERING APPARATUS

[75] Inventor: Hans J. Hansen, Pleasanton, Calif.

[73] Assignee: Ultrapointe Corporation, San Jose, Calif.

[21] Appl. No.: 181,566

[22] Filed: Jan. 14, 1994

[51] Int. Cl.[6] .............................. G02B 5/08; G02B 7/182
[52] U.S. Cl. .......................... 359/856; 359/857; 359/865; 359/872; 219/121.74; 219/121.78; 219/121.79
[58] Field of Search ..................................... 359/223, 225, 359/226, 850, 856, 857, 862, 865, 872, 874, 876; 219/121.61, 121.74, 121.78, 121.79, 121.8

[56] References Cited

U.S. PATENT DOCUMENTS

| | | | |
|---|---|---|---|
| 3,622,232 | 11/1971 | Munnerlyn | 359/857 |
| 3,892,475 | 7/1975 | Bardocz | 359/857 |
| 3,959,802 | 5/1976 | Plaot | 359/861 |
| 4,732,460 | 11/1988 | Kele et al. | 359/225 |
| 4,782,751 | 11/1988 | Colapinto | 359/857 |
| 5,136,414 | 8/1992 | Jenkins | 359/225 |

FOREIGN PATENT DOCUMENTS

| 0142704 | 6/1989 | Japan | 359/225 |
|---|---|---|---|

*Primary Examiner*—Ricky D. Shafer
*Attorney, Agent, or Firm*—Skjerven, Morrill, MacPherson, Franklin & Friel; Patrick T. Bever

[57] ABSTRACT

A beam steering apparatus including a base, an input block slidably connected to the base, and an output block slidably connected to the base. An input mirror is connected to the input block and an output mirror is connected to the output block. The input mirror is positioned to receive a light beam and to steer the light beam to the output mirror, and the output mirror is positioned to redirect the light beam to a target. The terminal portion of the light beam is adjustable in a first orthogonal direction by sliding the input block relative to the base, and in a second orthogonal direction by sliding the output block relative to the base. The input mirror is rotatably connected to the input block and the output mirror is rotatably connected to the output block. An angle of incidence of the output beam relative to the target is adjustable in a first plane by rotating the input mirror relative to the input block, and is adjustable in a second plane by rotating the output mirror relative to the output block. Adjustments of the input and output blocks relative to the base and rotation of the input and output mirrors relative to the input and output blocks, respectively, are performed in a minimum space and using a minimum number of tools.

10 Claims, 6 Drawing Sheets

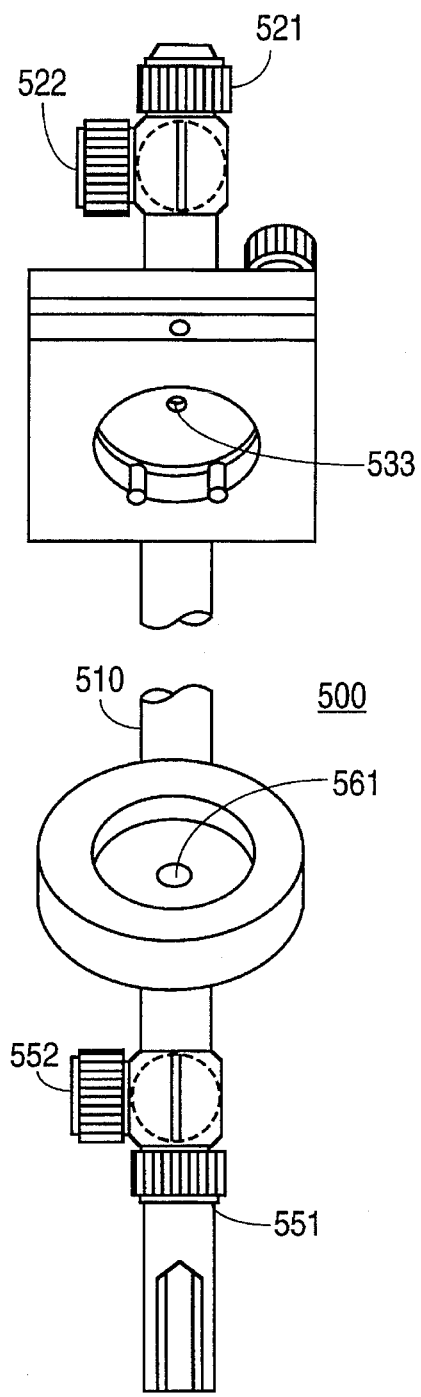
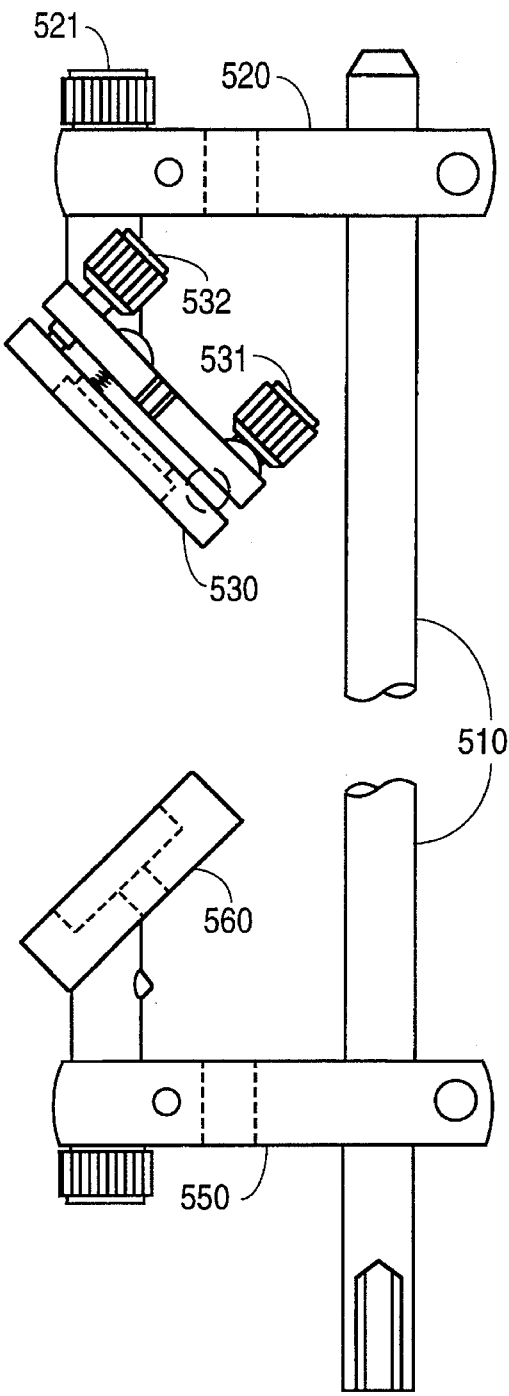
FIG. 5(a)
PRIOR ART
FIG. 5(b)
PRIOR ART

BEAM STEERING APPARATUS

BACKGROUND OF THE INVENTION

1. Field of the Invention

This invention relates to an apparatus for steering a light beam onto a desired target, and more specifically relates to an apparatus for steering a laser beam onto a target in a laser imaging system.

2. Description of the Prior Art

Beam steering apparatus typically include one or more mirrors which redirect, or "steer", a beam emitted by a stationary laser such that a terminal portion of the beam strikes a desired target. The precise location of the laser beam and an angle of incidence of the beam on the target is determined by the relative position of the mirrors.

FIGS. 5(a) and 5(b) show a typical prior art beam steering apparatus 500. The apparatus 500 includes a shaft 510, a first bracket 520 and a second bracket 550 adjustably connected to the shaft 510. A first mirror mount 530 is adjustably connected to the first bracket 520 and a second mirror mount 560 is adjustably connected to the second bracket 550. Mirrors (not shown) are attached to mounting points 533 and 561 respectively formed on the first mirror mount 530 and the second mirror mount 560. The relative angles between the reflective surfaces of the mirrors 540, 570 are adjusted by manipulating knobs 521, 522 located on the first bracket 520, knobs 531, 532 located on the bracket 530, and knobs 551, 552 located on the second bracket 550.

Another approach to steering a light beam is to physically change the position and angular orientation of the light source. For example, in the case of a laser light source, the laser could be physically moved relative to a fixed mirror.

A problem with the prior art beam steering apparatus is that adjustment of the beam is complicated and requires a large amount of space around the apparatus in which to maneuver to effect the desired adjustment.

SUMMARY OF THE INVENTION

An object of the present invention is to provide an apparatus for steering a beam in which a point of incidence of the beam is adjustable in two orthogonal directions and an angle of incidence of the beam is adjustable in two orthogonal directions.

Another object of the present invention is to provide an apparatus which allows the above-described adjustments to be performed with a minimum number of tools and within a minimal space.

A beam steering apparatus in accordance with the present invention is superior to the above-described prior art beam steering apparatus in that adjustment of a redirected beam is greatly simplified and can be effected in a confined space with a minimum number of tools.

The apparatus includes a base, an input block adjustably connected to the base, and an output block adjustably connected to the base. An input mirror is connected to the input block, and an output mirror is connected to the output block. The input mirror is positioned to receive a beam and to redirect the beam to the output mirror, and the output mirror is positioned to further redirect the beam such that a terminal portion of the beam strikes a target. The terminal portion of the beam is adjustable in a first orthogonal direction by sliding the input block relative to the base, and the terminal portion of the beam is adjustable in a second orthogonal direction by sliding the output block relative to the base. Because the position of the beam can be adjusted in two orthogonal directions by sliding the input and output blocks relative to the base, the adjustment is greatly simplified over the prior art apparatus.

Also in accordance with the present invention, the input mirror is rotatably connected to the input block and the output mirror is rotatably connected to the output block. An angle of incidence of the beam relative to the target is adjustable in a first plane by rotating the input mirror relative to the input block, and is adjustable in a second plane by rotating the output mirror relative to the output block. Because the angle of incidence of the beam can be adjusted in two orthogonal directions by rotating the input and output mirror relative to the input and output blocks, the adjustment is greatly simplified over the prior art apparatus.

Also in accordance with the present invention, an input block locking screw is adjustably connected to an upper surface of the input block such that the input block locking screw may be loosened from above the input block using a first tool. The input block also includes an adjustment hole for receiving the first tool such that the first tool may be used as a lever to slidably adjust the input block relative to the base. In addition, an output block locking screw and adjustment hole are similarly provided on the output block. Because the input and output block locking screws and adjustment holes are positioned on upper surfaces of the input and output blocks, the amount of space necessary to adjust the position of these blocks is greatly reduced over the prior art apparatus. Further, because the input and output blocks may be positioned using the same tool used for loosening the locking screws, the number of tools necessary to adjust the apparatus is reduced.

Also in accordance with the present invention, the input and output mirrors are attached to rotatable shafts such that an angle of incidence of the output beam relative to the target is adjustable by rotation of the shafts. A locking screw is provided on the upper surface of the input block for securing the input mirror shaft to the input block. Similarly, a locking screw is provided on the side surface of the output block for securing the output mirror shaft to the output block. Holes are formed in the input mirror shaft and output mirror shaft which are formed to receive a second tool used to adjust the locking screws. As such, the rotated position of input mirror and output mirror may be adjusted using a single tool.

BRIEF DESCRIPTION OF THE DRAWINGS

These and other features, aspects, and advantages of the present invention will become better understood with regard to the following description, appended claims, and accompanying drawings where:

FIGS. 5(a) and 5(b) show front and side views, respectively, of a prior art beam steering apparatus.

DESCRIPTION OF THE PREFERRED EMBODIMENT

An apparatus 1 for steering a light beam 5 from a light source 3 to a target 9 in accordance with the present invention is shown in FIGS. 1–4.

Figure 1:
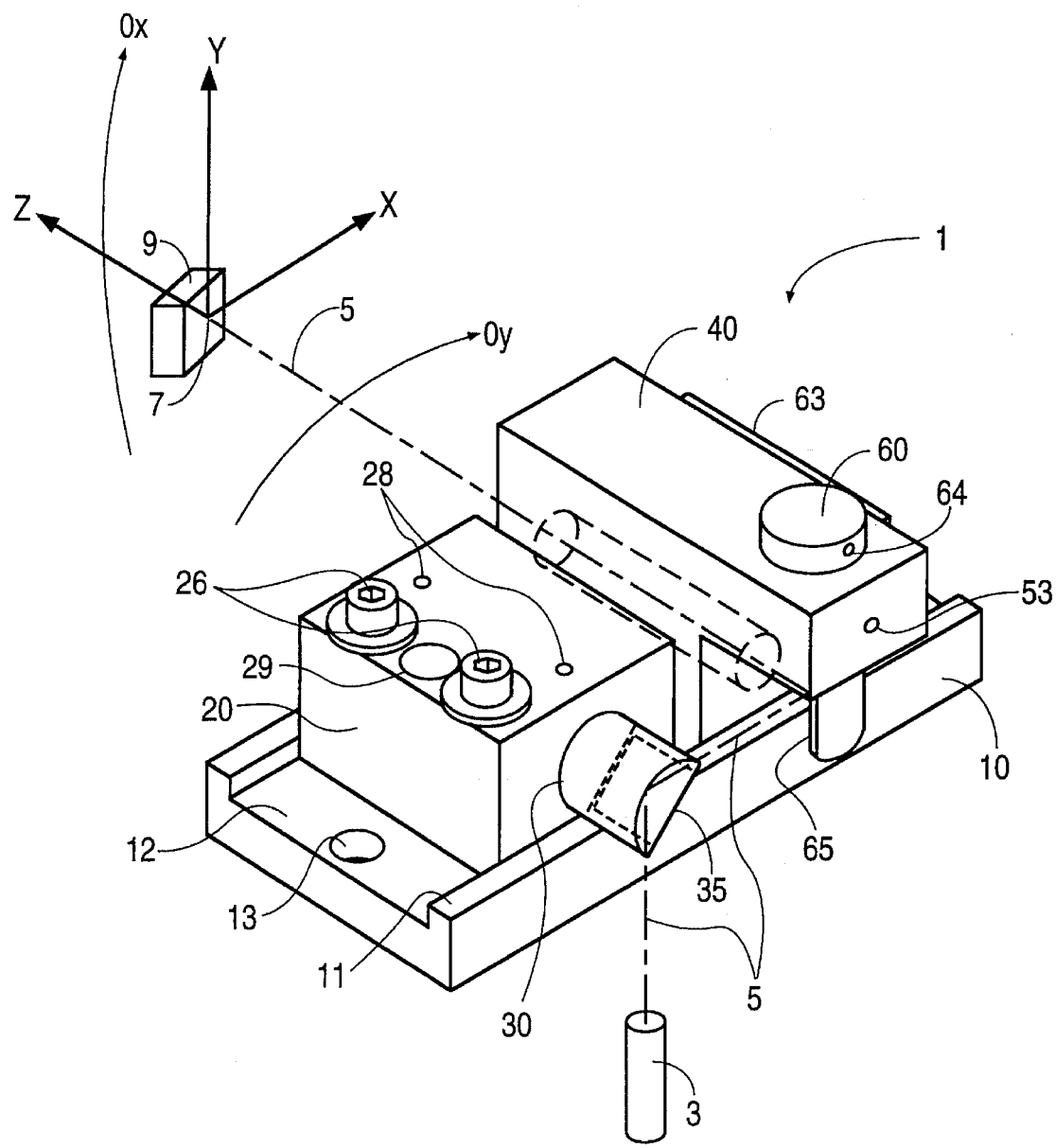
FIG. 1 shows a perspective view of the beam steering device according to the present invention.
Figure 2:
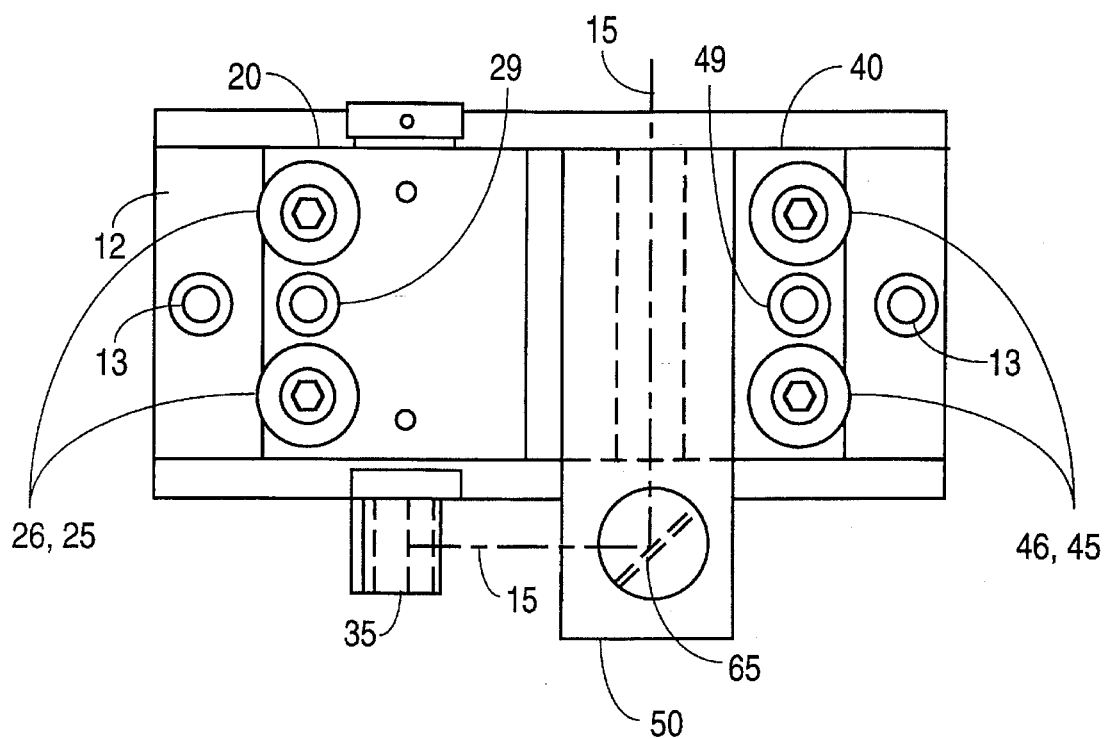
FIG. 2 shows a top view of the beam steering device of FIG. 1.

Referring to FIG. 1, the apparatus 1 includes a base 10, an input block 20 connected to the base 10, an input mirror 35 connected to the input block 20, an output block 40 connected to the base 10, and an output mirror 65 connected to the output block 40.

In a preferred embodiment, the apparatus 1 is incorporated into a laser imaging system (not shown) which is manufactured by the assignee of the present invention and disclosed in co-pending U.S. application Ser. No. 08/080,014, entitled "Laser Imaging System for Inspection and Analysis of Sub-Micron Particles" [Attorney Docket Number M-2466-US], incorporated herein by reference. In the laser imaging system, the light source 3, which can be a gas laser, is mounted in a fixed relationship with the apparatus 1 and generates a beam 5. The beam 5 is directed in the vertical (y-axis) direction and reflected by the input mirror 35 toward the output mirror 65. The output mirror 65 then redirects the laser beam 5 to a target 9, which can be a workpiece or other object being examined by the laser imaging system. As used herein, the portion of the laser beam 5 which strikes the target 9 is referred to as a terminal portion 7.

The base 10 includes an upper surface 11 which defines a linear groove 12. The groove 12 is aligned in a direction corresponding to the x-axis direction (FIG. 1). In a preferred embodiment of the present invention, the base 10 is approximately 4.51 inches long, 2.15 inches wide and 0.50 inches thick. The groove 12 is approximately 1.75 inches wide (measured in the z-direction in FIG. 1). The base 10 is preferably machined aluminum and includes four or more threaded holes (not shown) formed on the upper surface 11 in the groove 12 for securing the input block 20 and the output block 40. In addition the base 10 includes one or more holes 13 for receiving a fastener such that the base 10 can be connected the above-mentioned laser imaging system.

Figure 3A:
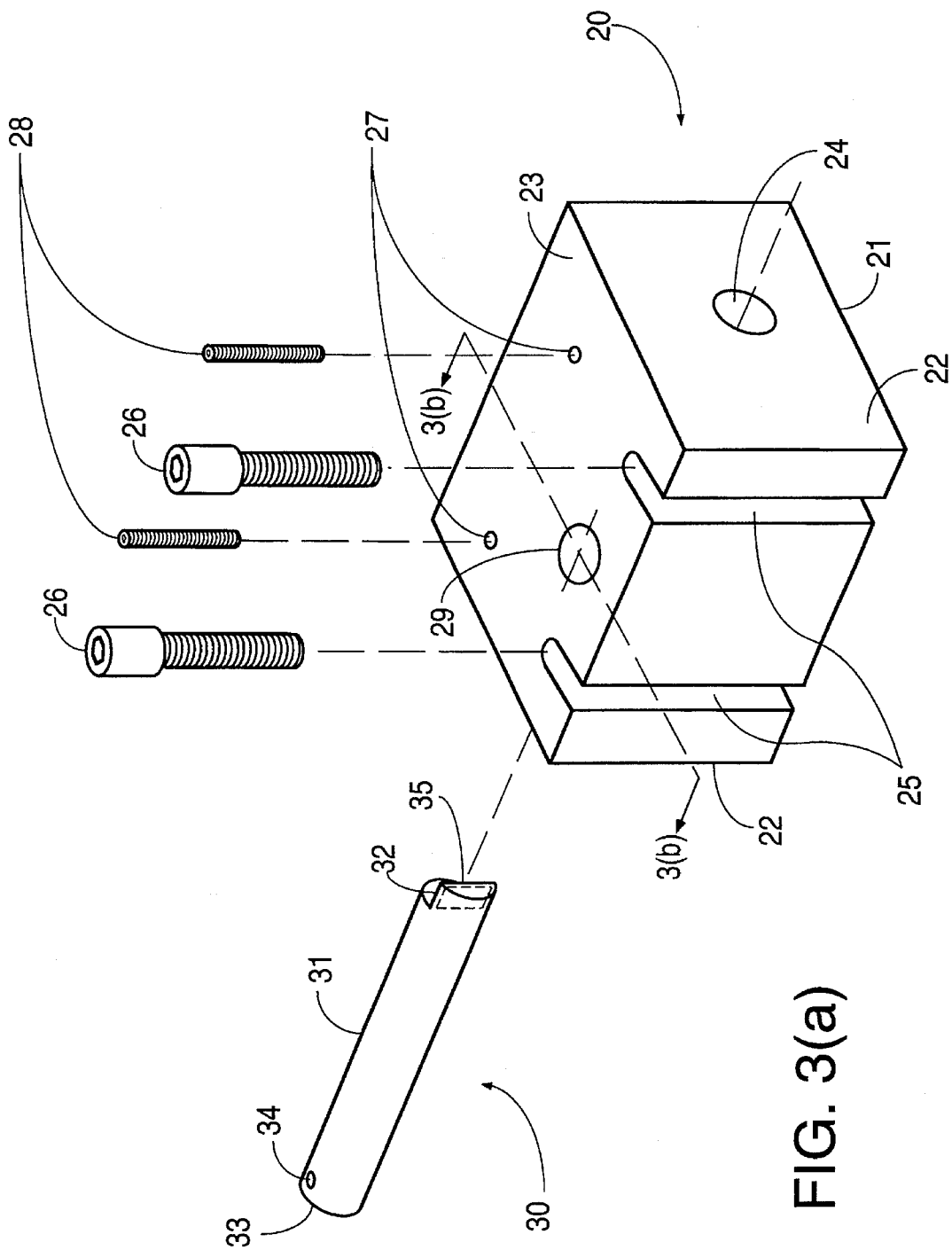
FIG. 3(a) shows an exploded perspective view of the input block of the beam steering device shown in FIGS. 1 and 2.
Figure 3B:
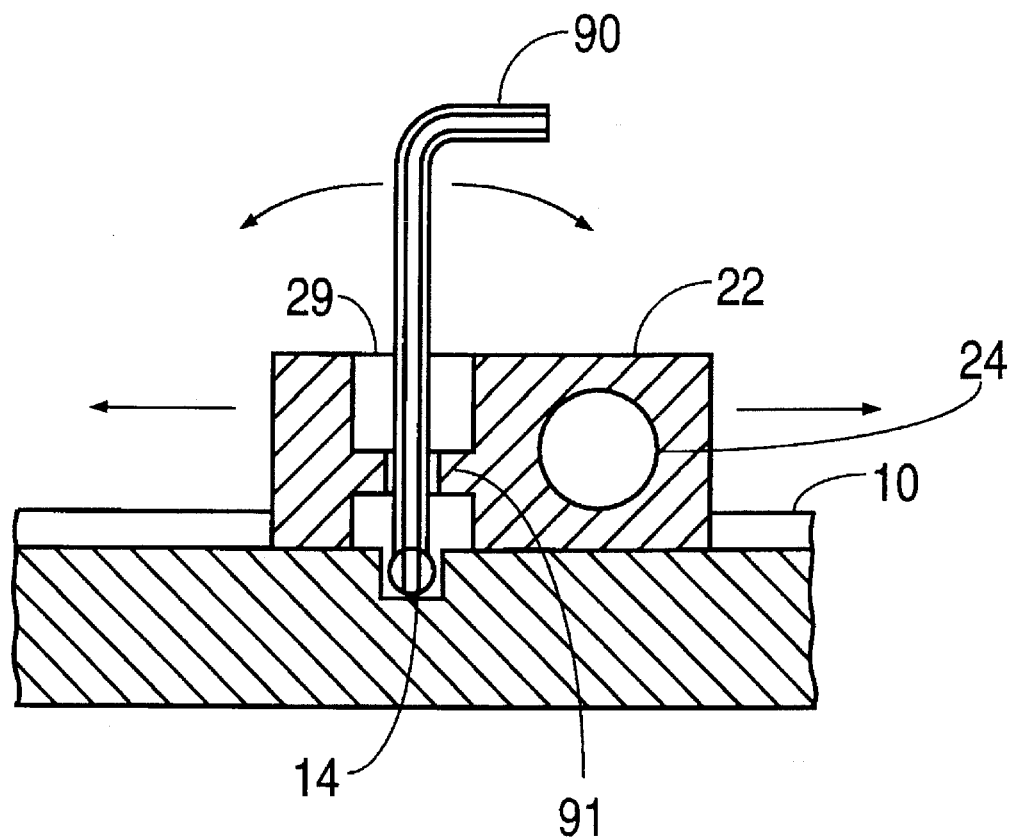
FIG. 3(b) shows a section view of the input block indicating an adjustment of the input block relative to the base.

As best shown in FIG. 3(a), the input block 20 is a six-sided fixture having a width (measured in the z-direction in FIG. 1) which fits within the groove 12 such that the input block 20 is slidable along the groove 12. The input block 20 includes a lower surface 21 facing the groove 12, a pair of side surfaces 22, and a upper surface 23. The input block 20 defines a through-hole 24 formed between the side surfaces 22 for receiving an input mirror assembly 30, described below. In addition, the input block 20 defines a pair of slots 25 which extend from the upper surface 23 to the lower surface 21. A pair of input block locking screws 26 are inserted through the slots 25 and connected to two of the threaded holes (not shown) which are formed in the base 10. When the input block locking screws 26 are loosely mounted in the threaded holes, the input block 20 is slidable in the groove 12 over a range defined by the slots 25. Conversely, when the input block locking screws 26 are tightened, the input block 10 is fixedly connected to the base 10. As shown in FIG. 3(b), an adjustment hole 29 is provided through the input block 20 such that an end of an Allen wrench 90, which is used to tighten the input block locking screws 26, may be used as a lever to adjust the position of the input block 20 relative to the base 10. To facilitate this adjustment, a web 91 is formed midway along the hole 29 and a counter bore 14 is provided in the upper surface 11 of the base 10 under the adjustment hole 29 for receiving an end of the Allen wrench 90.

The input block 20 also defines a pair of threaded holes 27 extending from the upper surface 23 and intersecting the through-hole 24. A pair of mirror assembly locking screws 28 are received in the holes 27 and are used to fixedly connect the input mirror assembly 30 to the input block 20, as described below.

The input block 20 is preferably formed from aluminum and is approximately 1.75 inches wide, 1.50 inches long and 1.00 inches high.

The input mirror 35 is connected to an input mirror assembly 30. The input mirror assembly 30 includes a shaft 31 having a semi-cylindrical first end 32 and a cylindrical second end 33. A diameter of the input mirror shaft 31 is selected such that the input mirror is rotatably received in the through-hole 24 formed in the input block 20. The semi-cylindrical first end is formed such that when the input mirror 35 is connected, a plane of the mirror intersects the axis of the shaft 31. In addition, an adjustment hole 34 is formed adjacent the second end 33.

When the input mirror assembly 30 is mounted on the input block 20, the input mirror 35 extends from one side surface 22 of the input block 20, and the second end 33 extends from the other side surface 22. The input mirror assembly 30 is rotatable relative to the input block 20 when the input mirror locking screws 28 (described above) are in a loosened position, and the input mirror assembly 30 is rigidly secured to the input block 20 when the input mirror locking screws 28 are in a tightened position. When the locking screws 28 are loosened, preferably using an Allen wrench (not shown), the same Allen wrench may then be inserted into the adjustment hole 34 and used as a lever to adjust the rotated position of the input mirror assembly 30.

The input mirror shaft 31 preferably has a diameter of approximately 0.625 inches a length of 2.69 inches. Finally, the preferred material for the input mirror 35 is commercially available from Melles Griot of Irvine, Calif. under part number 01 MFG 001, and is 5 mm square and 1 mm thick. The input mirror 25 is connected to the input mirror shaft 31 using silicon adhesive.

Figure 4:
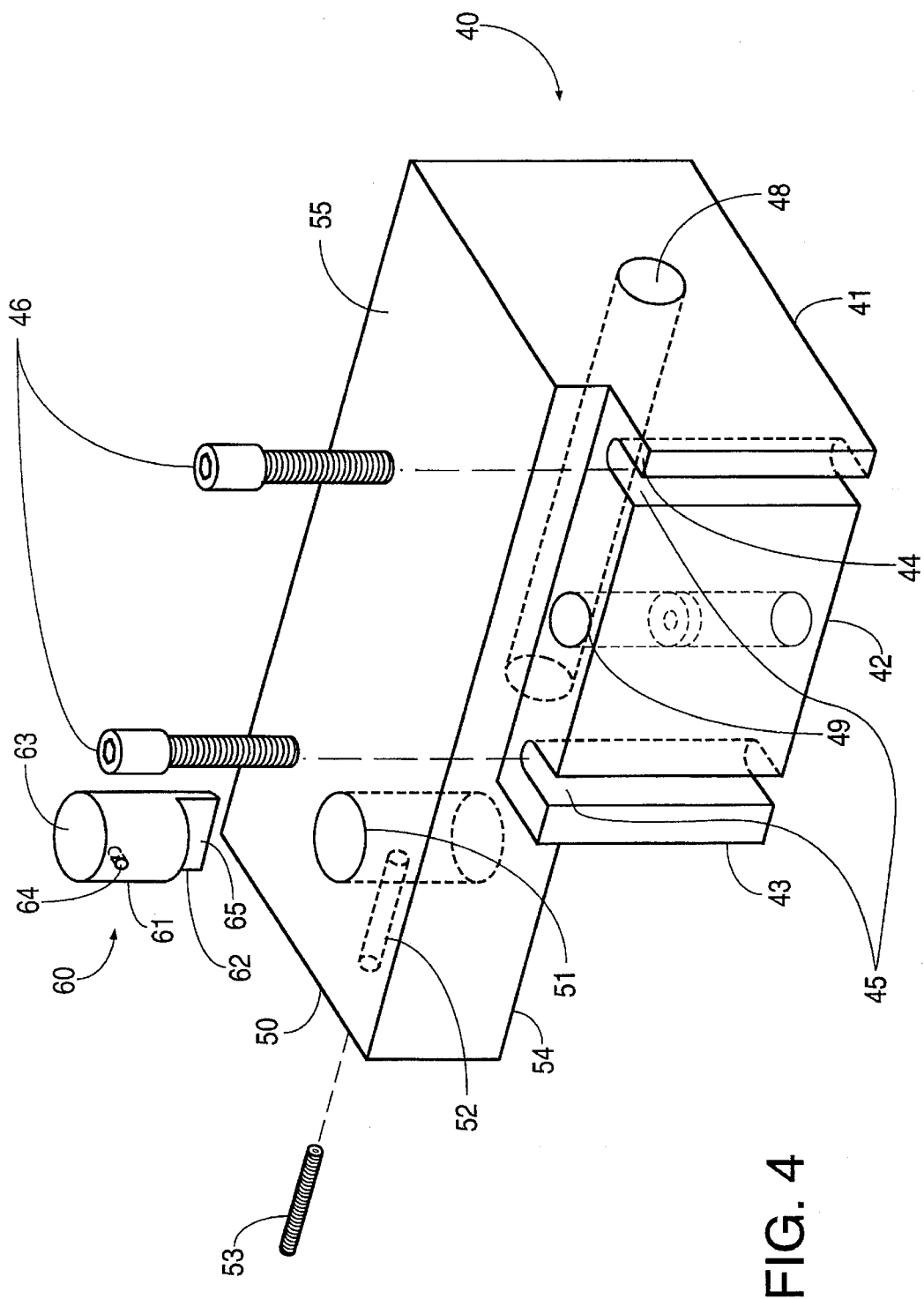
FIG. 4 shows a reverse exploded perspective view of the output block of the beam steering device shown in FIGS. 1 and 2.

As best shown in FIG. 4, according to the preferred embodiment, the output block 40 includes a body portion 41 having a width (measured in the z-direction in FIG. 1) which fits within the groove 12 such that the output block 40 is slidable along the groove 12. The body portion 41 includes a lower surface 42 facing the groove 12, a side surface 43 and an upper surface 44. The body portion 41 defines a horizontal through-hole 48 having an axis aligned in the z-direction (FIG. 1) through which the beam 5 is directed, described below. The body portion 41 also defines a pair of slots 45 formed through the upper surface 44. A pair of output block locking screws 46 secure the output block 40 to the base 10 when the output block locking screws 46 are in a tightened position, and allow the output block 40 to slide relative to the base 10 along the slots 45 when the output block locking screws 46 are in a loosed position. Finally, an adjustment hole 49 is formed in the output block and functions similar to the adjustment hole 29 of the input block 20 (discussed above).

The output block 40 also includes a cantilever portion 50 which is integrally formed with the upper surface 44 of the body portion 41. The cantilever portion 50 extends along the upper surface 44 and from the side surface 43 of body portion 41. The cantilever portion 50 defines a through-hole 51, which is formed in the y-direction (FIG. 1), for receiving an output mirror assembly 60, as described below. A horizontal output mirror locking screw receiving hole 52 is formed in an end of the cantilevered portion 50 and intersects the through-hole 51. An output mirror locking screw 53 is received in the output mirror locking screw receiving hole 52 and secures the output mirror assembly 60 as described below.

The output block 40 is preferably formed from aluminum with the body portion being 1.75 inches wide, 1.60 inches long and 1.00 inches high, and the cantilever portion 0.97 inches wide, 2.70 inches long and 0.57 inches high.

In the preferred embodiment of the present invention, the above-mentioned output mirror 65 is connected to an output mirror assembly 60. The output mirror assembly 60 includes an output mirror shaft 61 having a semi-cylindrical first end 62 to which is connected the output mirror 65, and a cylindrical second end 63. The output mirror shaft 61 has a diameter which allows it to rotate around its axis when received into the through-hole 51 formed in the cantilever portion 50 of the output block 40. The output mirror 65 is a planar mirror disposed parallel to the axis of the shaft 61. The semi-cylindrical first end 62 is cut such that when the output mirror 65 is mounted to the first end 62, a surface of the output mirror 65 intersects the axis of the shaft 61. When the output mirror assembly 60 is mounted on the output block 40, the output mirror 65 extends from a lower surface 54 of the cantilever portion 50, and the second end 63 extends from an upper surface 55 of the cantilever portion 50. Further, the output mirror 65 is positioned adjacent the horizontal through-hole 48 formed in the body portion 41 of the output block 40 for purposes described below. The output mirror assembly 60 is rotatable when the output mirror locking screw 53 (described above) is in a loosened position, and is rigidly secured when the output mirror locking screw 53 is in a tightened position. Finally, an adjustment hole 64 is formed adjacent the second end 63. The same Allen wrench used to loosen and tighten the locking screw 53 can be inserted into the adjustment hole 64 and used as a lever to adjust the rotated position of the output mirror assembly 60.

The output mirror shaft 61 is preferably 0.625 inches in diameter and has a length of 1.56 inches. Finally, the output mirror 65 is commercially available from Melles Griot of Irvine, Calif. under part number 01 MFG 001, and is 5 mm square and 1 mm thick, and is fastened to the output mirror shaft 61 using silicon adhesive.

Operation of the above-described apparatus 1 will now be described.

Referring to FIG. 1, with the apparatus 1 connected to the above-mentioned laser imaging system (not shown), the laser beam 5 is directed from a point below the apparatus 1 such that it travels along a vertical (y-axis) path and strikes the input mirror 35. The input mirror 35 and the output mirror 65 are relatively positioned such that the laser beam 5 is reflected by the input mirror 35 to the output mirror 65, and from the output mirror 65 toward the target 9. More specifically, the input mirror assembly 30 is rotated relative to the input block 20 such that the input mirror 35 is at an approximately 45° angle with respect to the x-axis and the y-axis, thereby redirecting the beam 5 from the y-axis direction to the x-axis direction (toward the output mirror 65). Similarly, the output mirror assembly 60 is rotated relative to the output block 40 such that the output mirror 65 is at an approximately 45° angle with respect to the x-axis direction and the z-axis direction, thereby redirecting the beam 5 from the x-axis direction to the z-axis direction (toward the target 9). Note that in the disclosed embodiment, the portion of the laser beam 5 located between the output mirror 65 and the target 9 travels through the through-hole 48 formed in the body portion 41 of the output block 40.

In accordance with one aspect of the present invention, the location of the incident portion 7 of the laser beam 5 is adjustable relative to the target 9 by sliding the input block 20 and the output block 40 relative to the base 10. That is, as the input block 20 is slid to the right (FIG. 1), the terminal portion 7 is adjusted downward along the y-axis direction, and when the input block 20 is slid to the left, the terminal portion 7 is adjusted upward along the y-axis direction. Similarly, as the output block 40 is slid to the right (FIG. 1), the terminal portion 7 is adjusted to the right along the x-axis direction, and when the output block 40 is slid to the left, the terminal portion 7 is adjusted to the left along the x-axis direction. A first Allen wrench is used to loosen and tighten the locking screws 26, 46 and is also used as a lever to adjust the position of the input block 20 and the output block 40 relative to the base 10.

In accordance with another aspect of the present invention, an angle of incidence of the laser beam 5 from the apparatus 1 to the target 9 is adjustable by rotating the input mirror assembly 30 relative to the input block 20 and the output mirror assembly 60 relative to the output block 40. That is, rotation of the input mirror assembly 30 relative to the input block 20 changes the angle of incidence in the $\Theta_x$ direction. Similarly, rotation of the output mirror assembly 60 relative to the output block 40 changes the angle of incidence in the $\Theta_y$ direction. A second Allen wrench is used to loosen and tighten the locking screws 28, 53 and is also used as a lever to adjust the rotated position of the input mirror assembly 30 and the output mirror assembly 60.

In accordance with another aspect of the present invention, the above-described adjustments are performed in a minimum amount of space and with only two tools. That is, adjustment of the input block 20 relative to the base 10 is performed by accessing the input block locking screws 26 from a position over the input block 20. Likewise, adjustment of the input mirror assembly 30 is performed by accessing the input mirror locking screws 28 from a position over the input block 20. Further, adjustment of the output block 40 relative to the base 10 is performed by accessing the output block locking screws 46 from a position over the output block 40. Finally, adjustment of the output mirror assembly 60 is performed by accessing the output mirror locking screw 53 from a position to the side of the output block 40.

Although the present invention has been described in considerable detail with reference to the preferred embodiment described above, other versions are possible. For example, the output mirror can be rotated such that the output beam is directed in an opposite direction along the z axis, thereby obviating the necessity of the through hole formed in the output block. Therefore, the spirit and scope of the appended claims should not be limited to the description of the preferred embodiment contained herein.

I claim:

1. An apparatus for steering a light beam from a light source to a target, a portion of the light beam adjacent the target being a terminal portion, the apparatus comprising:

a base;

a first block slidably connected to the base;

a first mirror connected to the first block:

a second block slidably connected to the base;

a second mirror connected to the second block;

wherein the first and second mirrors are relatively positioned such that the light beam is reflected by the first mirror to the second mirror and from the second mirror toward the target;

wherein a position of the terminal portion of the light beam is adjustable in a first direction by sliding the second block in the first direction relative to the base, and in a second direction, which is perpendicular to the first direction, by sliding the first block in the first direction relative to the base; and wherein the base defines a linear groove, and the first and second blocks are confined to slide in the groove.

2. An apparatus according to claim 1 further comprising:

a first block locking screw adjustably connected to an upper surface of the first block; and a second block locking screw adjustably connected to an upper surface of the second block;

wherein the first block and the second block are adjustable by accessing the first and second locking screws from a position above the first and second blocks.

3. An apparatus according to claim 1, wherein:

the groove is aligned in the first direction, the first block defines a first through-hole having an axis aligned in a third direction, and the second block defines a second through-hole having an axis aligned in the second direction perpendicular to the first and third directions;

wherein the first mirror is fixedly connected to a first end of a first shaft, the first shaft being rotatably received in the first through-hole, the first mirror extending from the first through-hole;

wherein the second mirror is fixedly connected to a second end of a second shaft, the second shaft being rotatably received in the second through-hole, the second mirror extending from the second through-hole; and wherein an angle of incidence of the light beam on the target is adjusted by rotation of the first and second shafts relative to the first and second blocks, respectively.

4. An apparatus of claim 3 wherein the second block defines a third through-hole having an axis parallel to the first through-hole, the third through-hole being positioned adjacent the second mirror such that the portion of the light beam reflected from the second mirror to the target is directed through the third through-hole.

5. An apparatus for steering a light beam from a light source to a target comprising:

a base;

a first block movably connected to the base, the first block defining a first through-hole having an axis aligned in a first direction, and a first mirror assembly rotatably connected to the first block, the first mirror assembly including a first shaft having a first end, the first shaft being rotatably received in the first through-hole, the first mirror assembly also including a first mirror fixedly connected to the first end, the first mirror extending from the first through-hole;

a second block movably connected to the base, the second block defining a second through-hole having an axis aligned in a second direction perpendicular to the first direction; and a second mirror assembly rotatably connected to the second block, the second mirror assembly including a second shaft having a second end, the second shaft being rotatably received in the second through-hole, the second mirror assembly also including a second mirror fixedly connected to the second end, the second mirror extending from the second through-hole;

wherein an angle of incidence of the light beam on the target is adjustable by rotation of the first and second mirror assemblies relative to the first and second blocks, respectively; and wherein the first an second blocks are movable in a third direction relative to the base, the third direction being perpendicular to the first direction and the second direction.

6. An apparatus according to claim 5, wherein the base defines a linear groove, and the first and second blocks are confined to slide in the groove.

7. An apparatus according to claim 5, further comprising:

a first block locking screw adjustably connected to an upper surface of the first block; and a second block locking screw adjustably connected to an upper surface of the second block;

wherein the first block and the second block are adjustable by accessing the first and second locking screws from a position above the first and second blocks.

8. An apparatus of claim 5 wherein the second block defines a third through-hole having an axis parallel to the first through-hole, the third through-hole being positioned adjacent the a second mirror such that the portion of the light beam reflected from the second mirror to the target is directed through the third through-hole.

9. An apparatus for steering a light beam from a light source to a target, a portion of the light beam adjacent the target being a terminal portion, the apparatus comprising:

a base defining a groove aligned in a first direction;

a first block connected to the base, the first block having a first lower surface received in the groove, the first block also having a first side surface;

a first mirror assembly including a shaft rotatably connected to the first block and extending from the first side surface, the first mirror assembly also including a first mirror fixedly connected to the first end portion of the first shaft;

a second block connected to the base, the second block having a second lower surface received in the groove, the second block also having a second side surface, a cantilever portion extending from the second side surface, the cantilever portion having a third lower surface; and a second mirror assembly including a second shaft rotatably connected to the cantilever portion and extending from the third lower surface, the second mirror assembly also including a second mirror fixedly connected to the second shaft;

wherein the first and second mirrors are relatively positioned such that the light beam is reflected by the first mirror to the second mirror and from the second mirror toward the target;

wherein a position of the terminal portion of the light beam is adjustable in a second direction by sliding the first block relative to the base, and in the first direction, which is perpendicular to the second direction, by sliding the second block relative to the base; and wherein an angle of incidence of the light beam on the target is adjustable by rotation of the first and second mirror assemblies relative to the first and second blocks, respectively.

10. A apparatus according to claim 9, further comprising a first block locking screw connected to the first block and a second block locking screw connected to the second block;

wherein the first block and the second block are adjustable relative to the base only when the first and second block locking screws are in loosened positions, respectively; and wherein the first and second block locking screws are loosened and tightened from a position over the apparatus.

* * * * *